(12) United States Patent  
Ito et al.

(10) Patent No.: US 6,617,809 B2  
(45) Date of Patent: Sep. 9, 2003

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/074,120

(22) Filed: Feb. 12, 2002

(65) Prior Publication Data

US 2002/0109469 A1 Aug. 15, 2002

(30) Foreign Application Priority Data

Feb. 13, 2001 (JP) .................................... P.2001-034978

(51) Int. Cl.[7] .............................................. H05B 37/00
(52) U.S. Cl. ...................... 315/312; 315/224; 315/194; 315/209 R
(58) Field of Search .............................. 315/312, 194, 315/195, 200 R, 209 R, 212, 211, 213, 224, 246, 276, 277, 291, 323, 324

(56) References Cited

U.S. PATENT DOCUMENTS 6,005,352 A * 12/1999 Odaka ..................... 315/209 R
6,340,870 B1 * 1/2002 Yamashita et al. ........... 315/308
6,504,316 B2 * 1/2003 Ito et al. ...................... 315/224

FOREIGN PATENT DOCUMENTS

| JP | 4-141988 | 5/1992 |
| JP | 2001-6891 | 1/2001 |
| JP | 2001-203088 | 7/2001 |
| JP | 2001-237089 | 8/2001 |
| JP | 2001-257092 | 9/2001 |

* cited by examiner

Primary Examiner—Don Wong  
Assistant Examiner—Tuyet T. Vo  
(74) Attorney, Agent, or Firm—Fish & Richardson P.C.

(57) ABSTRACT

A lighting circuit carrying out lighting control of plural discharge lamps in which depressing of ripple current and noise, small-sizing, and low cost are realized. Plural DC-DC converting circuits (3_1, 3_2) for converting direct current input voltage to designated direct current voltage by ON/OFF control of switching elements in a discharge lamp lighting circuit carrying out controlling lighting plural discharge lamps. Control signal from a control circuit 7 is supplied to each switching element constituting each DC-DC converting circuit, and state of conductivity or non-conductivity of each switching element is controlled as non-synchronization.

4 Claims, 8 Drawing Sheets

FIG. 9

DISCHARGE LAMP LIGHTING CIRCUIT

BACKGROUND OF THE INVENTION

The present invention relates to a discharge lamp lighting circuit which controls lighting plural discharge lamps in that ripple current and noise are depressed.

A lighting circuit of a discharge lamp (metal halide lamp etc.) is known, which provides a direct current power source, a direct current—direct current converting circuit (DC-DC converter), a direct current—alternating current converting circuit (bridge type circuit, DC-AC converter etc.), a starting circuit, and so on. The following two modes are used for constituting a lighting circuit controlling lighting plural, two for example, discharge lamps. One is a mode in which each discharge lamp is lighted by each circuit preparing two sets of circuit having a DC-DC converting circuit and a DC-AC converting circuit. The other is a mode in which two discharge lamps are lighted using a DC-DC converting circuit obtaining positive polarity output, a DC-DC converting circuit obtaining negative polarity output, and one DC-AC converting circuit.

Since two discharge lamps are controlled to light respectively using one control circuit in any of the modes, it is advantage to simplify constitution and to make low cost. In the case adopting PWM (Pulse Width Modulation) control, control signal is obtained by generating saw tooth wave of a determined frequency, detecting voltage and current applied to the discharge lamps, and comparing arithmetic signal (direct current voltage) calculated based on the detected signal with the saw tooth wave. By carrying out ON/OFF control supplying the control signal to a switching element of each DC-DC converting circuit, duty ratio (or duty cycle) can be provided. (As the result, output voltage of the DC-DC converting circuit is determined.)

Figure 8:
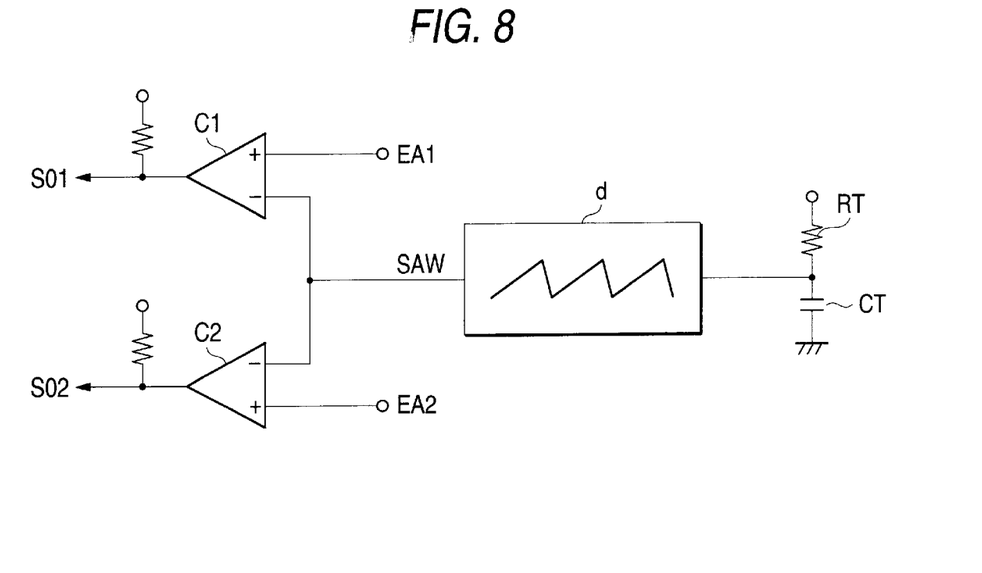
FIG. 8 is a view for describing about the conventional constitution example.

Only the main part of such the circuit is shown in FIG. 8, an arithmetic signal based on voltage detecting signal and current detecting signal detected from one discharge lamp (described "EA1") is supplied to a comparator C1 as positive input, and an arithmetic signal based on voltage detecting signal and current detecting signal detected from the other discharge lamp (described "EA2") is supplied to a comparator C2 as positive input.

Although saw tooth wave (described "SAW") supplied to a negative terminal of each of comparators C1 and C2 is generated at an oscillating circuit d using time constant by a resistor RT and a capacitor CT for example, numbers of circuit elements can be decreased by sharing the oscillating circuit in the control circuit. That is, saw tooth wave using for obtaining control signal to one DC-DC converting circuit and saw tooth wave using for obtaining control signal to the other DC-DC converting circuit are made the same signal. Then, by that the result comparing arithmetic signals EA1 and EA2 of every discharge lamp with each of comparators C1 and C2 against the signal (output signals SO1 and SO2) is supplied to individual switching element constituting each DC-DC converting circuit, ON/OFF control thereof is carried out so that each duty ratio is determined.

Since synchronous relation appears at ON state of the switching element about the individual switching element constituting each DC-DC converting circuit in the above-mentioned circuit, the following problems appear:

Increase of ripple current; and

Increase of radio (frequency) noise.

Figure 9:
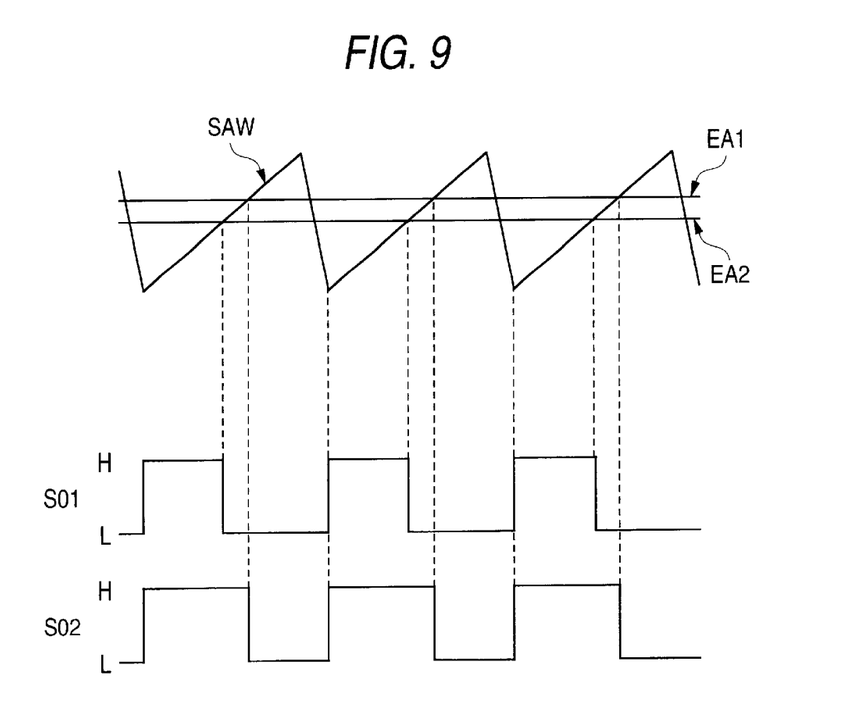
FIG. 9 is a waveform view for describing the conventional problem.

An example of waveform and phase relation about above-mentioned potentials of arithmetic signals EA1 and EA2, waveform of saw tooth wave SAW, output signal SO1 of the comparator C1, and output signal SO2 of the comparator C2 is shown in FIG. 9. Signal SO1 (or SO2) becomes L (low) level when potential of SAW is higher than potential of signal EA1 (or EA2)

Because the switching element of each DC-DC converting circuit is ON/OFF-controlled based on signals SO1 and SO2, ripple current of the capacitor provided at an input stage of the DC-DC converting circuit becomes large so that it causes large capacity and large size of the capacitor and increase of cost when both of element turns ON state or OFF state synchronizing.

Being large in ripple current means the noise component too becomes large responding to it, therefore, addition of elements and parts for depressing noise is unavoidable so as to cause large-size circuit and increase of cost.

SUMMARY OF THE INVENTION

Then, an object of the invention is to depress ripple current and noise, to make small size and low cost in a lighting circuit carrying out controlling lighting plural discharge lamps.

In order to solve the above-mentioned problems, the discharge lamp lighting circuit of the invention provides plural DC-DC converting circuits for converting direct current input voltage to designated direct current voltage and controlling lighting plural discharge lamps, wherein state of conductivity or non-conductivity of each switching element constituting the above-mentioned DC-DC converting circuit is controlled as non-synchronization.

According to the invention, ripple current and radio noise can be depressed by controlling so that signals supplied to each switching element constituting the DC-DC converting circuit do not synchronize.

DETAILED DESCRIPTION OF THE PREFERRED EMBODIMENTS

Figure 1:
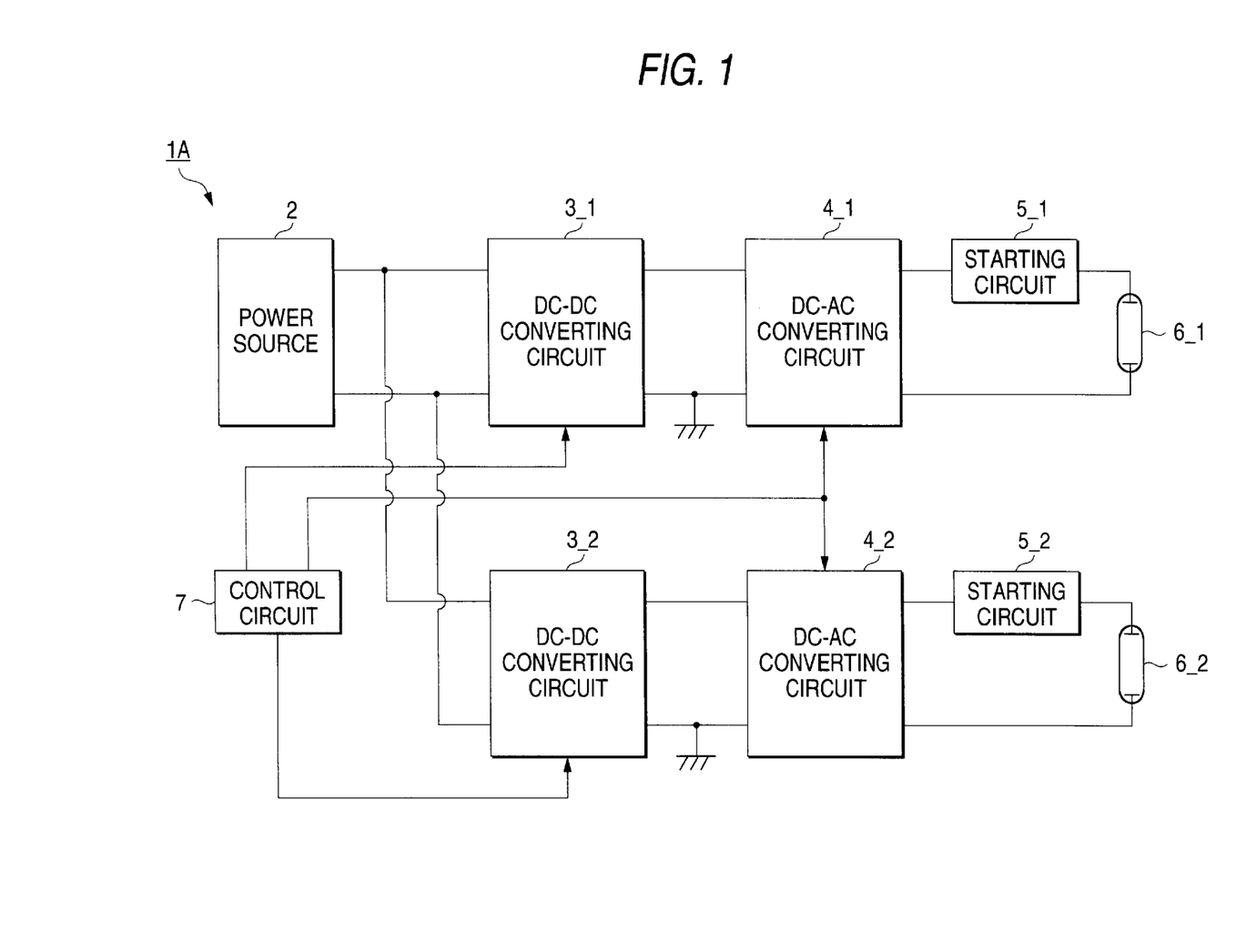
FIG. 1 is a circuit block diagram showing a constitution example according to the invention.
Figure 2:
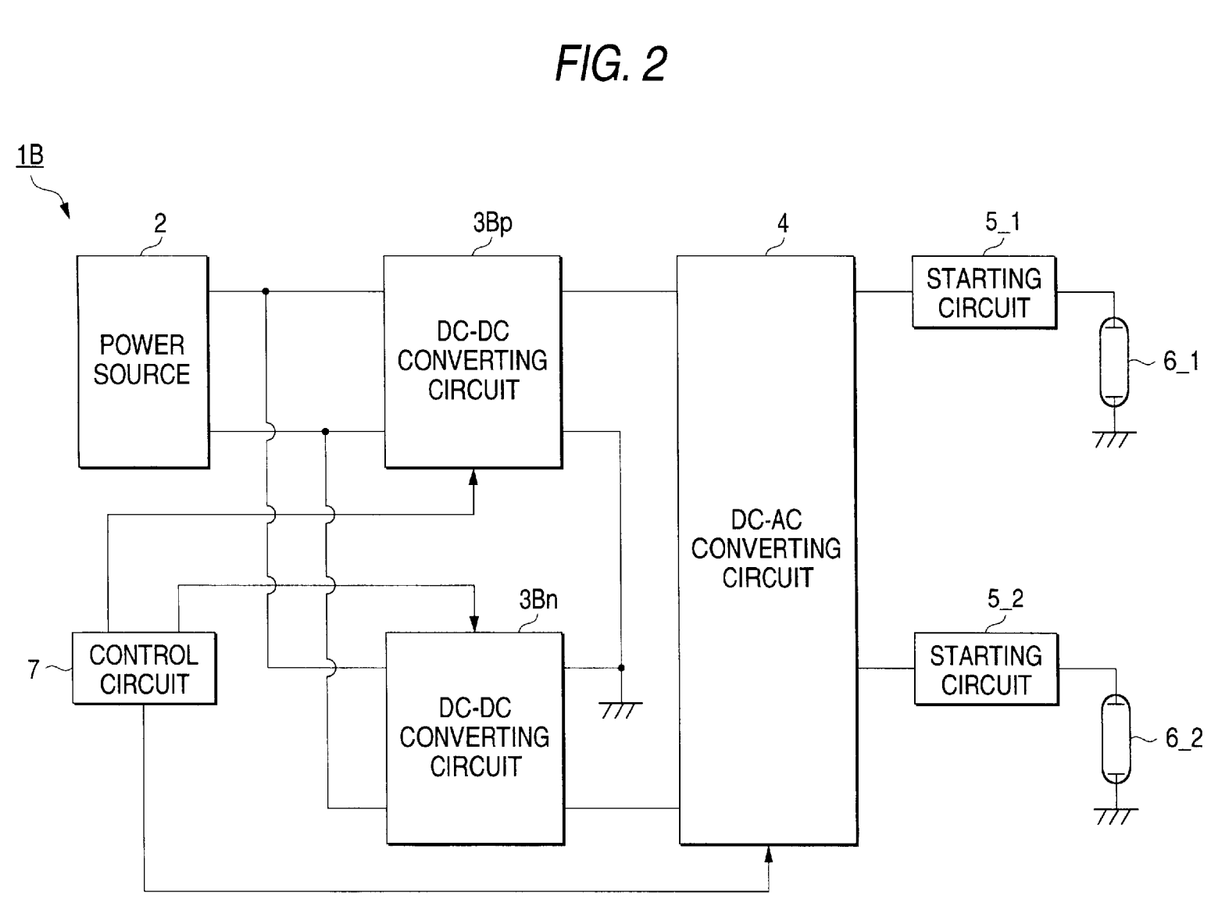
FIG. 2 is a circuit block diagram showing another constitution example according to the invention.

FIG. 1 and FIG. 2 are views for describing fundamental constitution of a discharge lamp lighting circuit according to the invention.

The invention relates to a lighting circuit for carrying out lighting control of plural discharge lamps, and constitution mode of lighting circuit for carrying out lighting control of two discharge lamps for example are listed as the following modes:

(A) A mode in which two sets of circuits are prepared, each having a DC-DC converting circuit and a DC-AC converting circuit, thereby to control lighting of a discharge lamp in each circuit; and (B) A mode in which two discharge lamps are lighted using a DC-DC converting circuit obtaining positive pole output, a DC-DC converting circuit obtaining negative pole output, and one DC-AC converting circuit.

FIG. 1 shows a constitution example of the mode (A), a lighting circuit 1A provides the following elements: (Number in the parenthesis shows a symbol.)

Direct current power source (2);

DC-DC converting circuits (3_1, 3_2);

DC-AC converting circuits (4_1, 4_2);

Starting circuits (5_1, 5_2);

Discharge lamps (6_1, 6_2); and

Control circuit (7).

In the constitution, for a circuit for the discharge lamp 6_1, the DC-DC converting circuit 3_1, the DC-AC converting circuit 4_1, and the starting circuit 5_1 are provided, and for a circuit for the discharge lamp 6_2, the DC-DC converting circuit 3_2, the DC-AC converting circuit 4_2, and the starting circuit 5_2 are provided. A control circuit 7 is commonly provided.

That is, in the discharge lamp lighting circuit 1A, after direct current voltage is supplied to the DC-DC converting circuits 3_1 and 3_2 from the direct current power source 2 through a lighting switch (not shown), each output voltage thereof is supplied to each of the DC-AC converting circuits 4_1 and 4_2. For each DC-DC converting circuit, a constitution for converting direct input voltage to desired direct current voltage by ON/OFF control of switching elements constituting the circuit, for example, a circuit of DC-DC converter having constitution of switching regulator (chopper type, flyback type etc.) is listed. Although a bridge type circuit (full-bridge circuit) and the like are listed for the DC-AC converting circuit, any circuit is available.

The starting circuit (starter circuit) 5_1 is a circuit supplying starting pulse to the discharge lamp 6_1, and sends to the discharge lamp 6_1 superimposing the starting pulse to output of the DC-AC converting circuit 4_1. The starting circuit 5_2 is a circuit supplying starting pulse to the discharge lamp 6_2, and sends to the discharge lamp 6_2 superimposing the starting pulse to output of the DC-AC converting circuit 4_2.

The control circuit 7 carries out lighting control responding to state of each discharge lamp, sends control signal to the DC-DC converting circuits 3_1 and 3_2, controls output voltage thereof, or sends control signal to the DC-AC converting circuits 4_1 and 4_2, and controls alternative operation.

FIG. 2 shows a constitution example of the mode (B), a lighting circuit 1B provides the following elements: (Number in the parenthesis shows a symbol.)

Direct current power source (2);

DC-DC converting circuits (3Bp, 3Bn);

DC-AC converting circuit (4);

Starting circuits (5_1, 5_2);

Discharge lamps (6_1, 6_2); and

Control circuit (7).

Difference from the lighting circuit 1A of FIG. 1 is as the followings.

The circuit portion 3Bp (DC-DC converter) for obtaining positive voltage output and the circuit portion 3Bn (DC-DC converter) for obtaining negative voltage output are arranged in parallel each other.

The DC-AC converting circuit 4 is made common as one circuit (full-bridge, H-bridge, or the like type circuit).

Output voltage is controlled carrying out ON/OFF control of the switching elements in the circuit by that the control circuit 7 sends control signal to the circuit portions 3Bp and 3Bm, and control signal is sent to the DC-AC converting circuit 4 from the control circuit 7 so as to control alternative operation.

Although ON/OFF control (or control of conductivity/non-conductivity) of the elements is carried out, the above-mentioned demerit appears when the state of each element synchronizes at this time. Therefore, to avoid this demerit, it is desirable to supply control signal based on signal of different oscillating frequency to each switching element.

Figure 3:
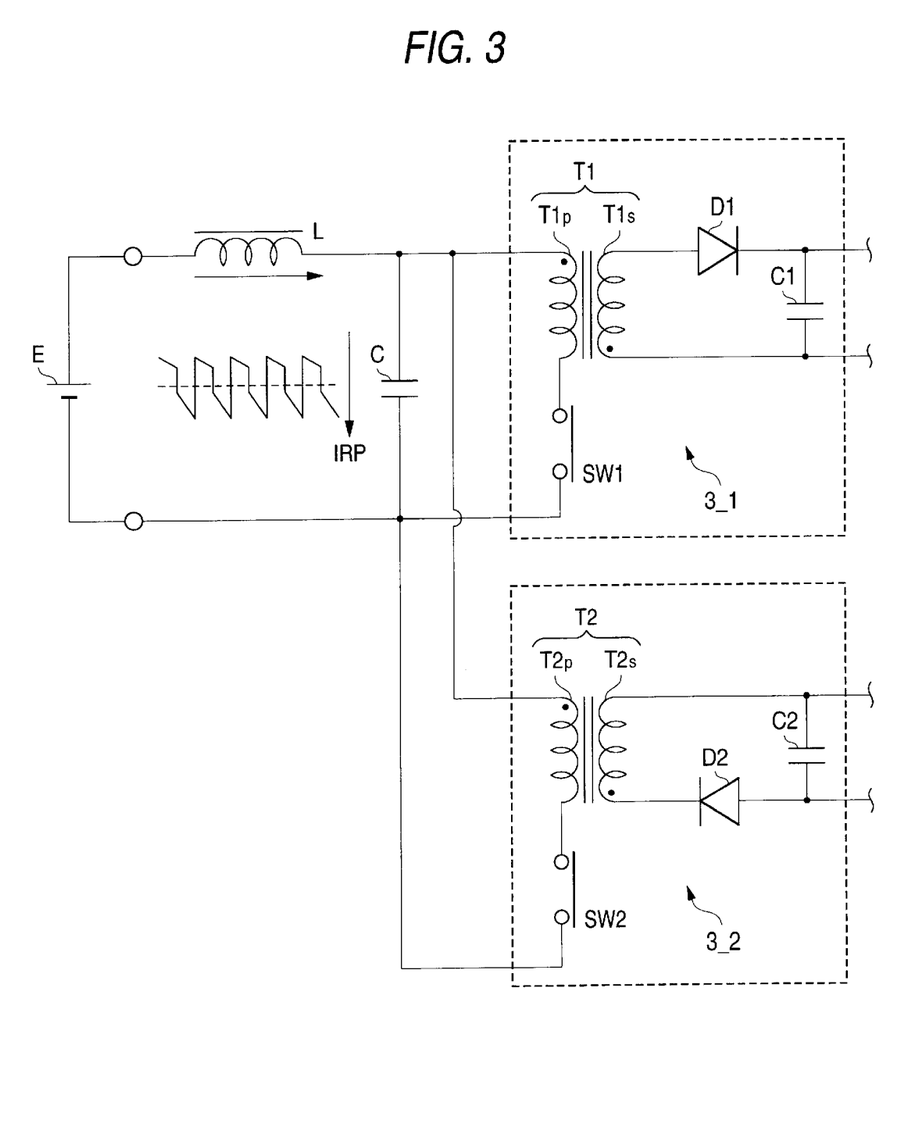
FIG. 3 is a describing view about constitution example of a DC-DC converting circuit.

FIG. 3 shows a main part of constituting example (flyback type) of a DC-DC converting circuit, which uses two transformers T1 and T2.

Each of primary windings T1$p$ and T2$p$ of the transformers T1 and T2 is connected in parallel, one end of the primary winding T1$p$ is connected to a direct current power source E through an inductor L, and to the other end of T1$p$, a switching element SW1 (Although symbol of switch is shown in the figure, an electric field effect transistor or the like is used.) is connected. One end of the primary winding T2$p$ is connected to the direct current power source E through the inductor L, and to the other end of T2$p$, a switching element SW2 (Although symbol of switch is shown in the figure, electric field effect transistor or the like is used.) is connected. To the switching elements SW1 and SW2, control signal from the control circuit 7 is supplied so as to carry out these switching controls.

A capacitor C is provided at front stages of the transformers T1 and T2, and current "IRP" shown in the figure shows ripple current flowing through the capacitor.

At secondary windings T1$s$ and T2$s$ of the transformers T1 and T2, rectifying smoothing circuits consisting of diodes and capacitors are provided respectively. That is, anode of the diode D1 is connected to one end of the secondary winding T1$s$, and cathode of the diode D1 is connected to the other end of the secondary winding T1$s$ through the capacitor C1, so that terminal voltage of the capacitor C1 is obtained as output of the above-mentioned circuit 3_1. Cathode of the diode D2 is connected to one end of the secondary winding T2$s$, and anode of the diode D2 is connected to the other end of the secondary winding T2$s$ through the capacitor C2, so that terminal voltage of the capacitor C2 is obtained as output of the above-mentioned circuit 3_2.

Figure 4:
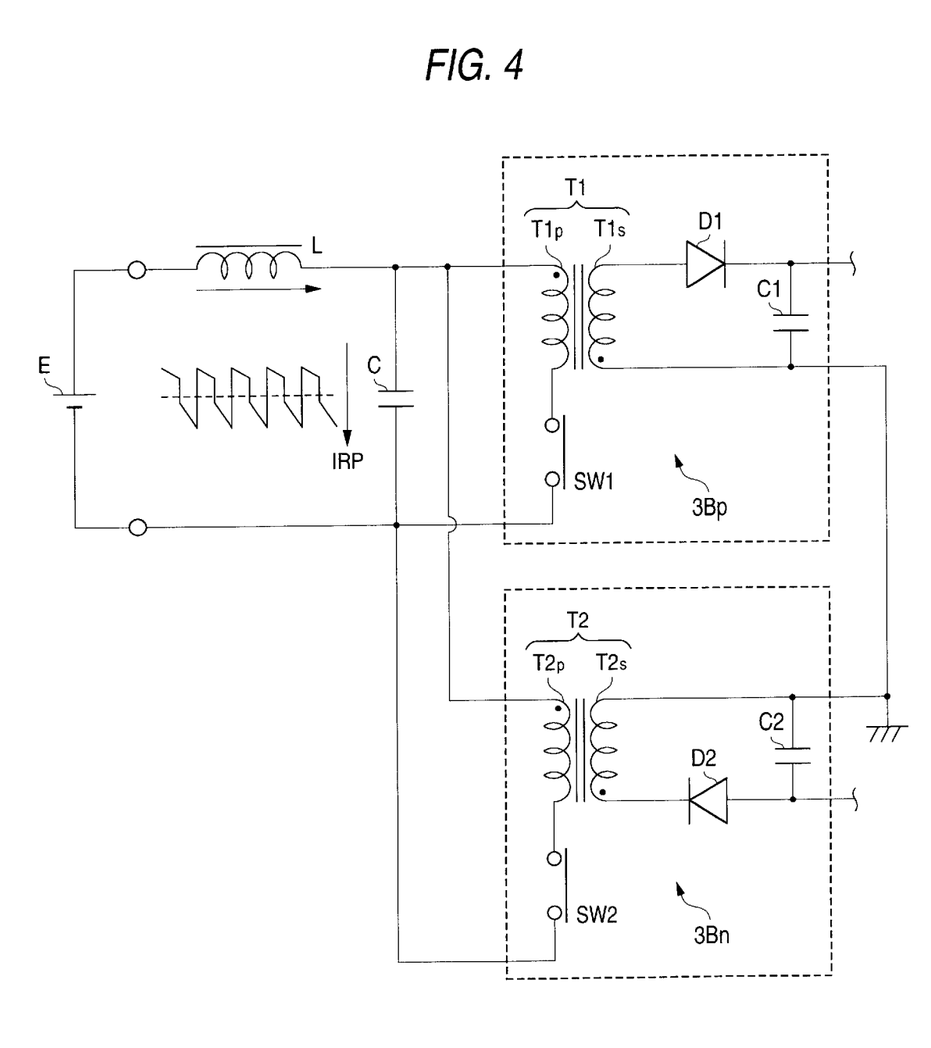
FIG. 4 is a describing view showing another example about constitution example of a DC-DC converting circuit.

FIG. 4 shows a constituting example of the above-mentioned circuits 3Bp and 3Bn, and difference from the constitution of FIG. 3 is the point that one end of the capacitor C1 (connecting point with the secondary winding T1$s$) and one end of the capacitor C2 (connecting point with the secondary winding T2$s$) are connected and grounded. That is, the circuit 3Bp provides the transformer T1, the switching element SW1, the diode D1, and the capacitor C1, so that positive output voltage is obtained from C1. The circuit 3Bm provides the transformer T2, the switching element SW2, the diode D2, and the capacitor C2, so that negative output voltage is obtained from C2.

Figure 5:
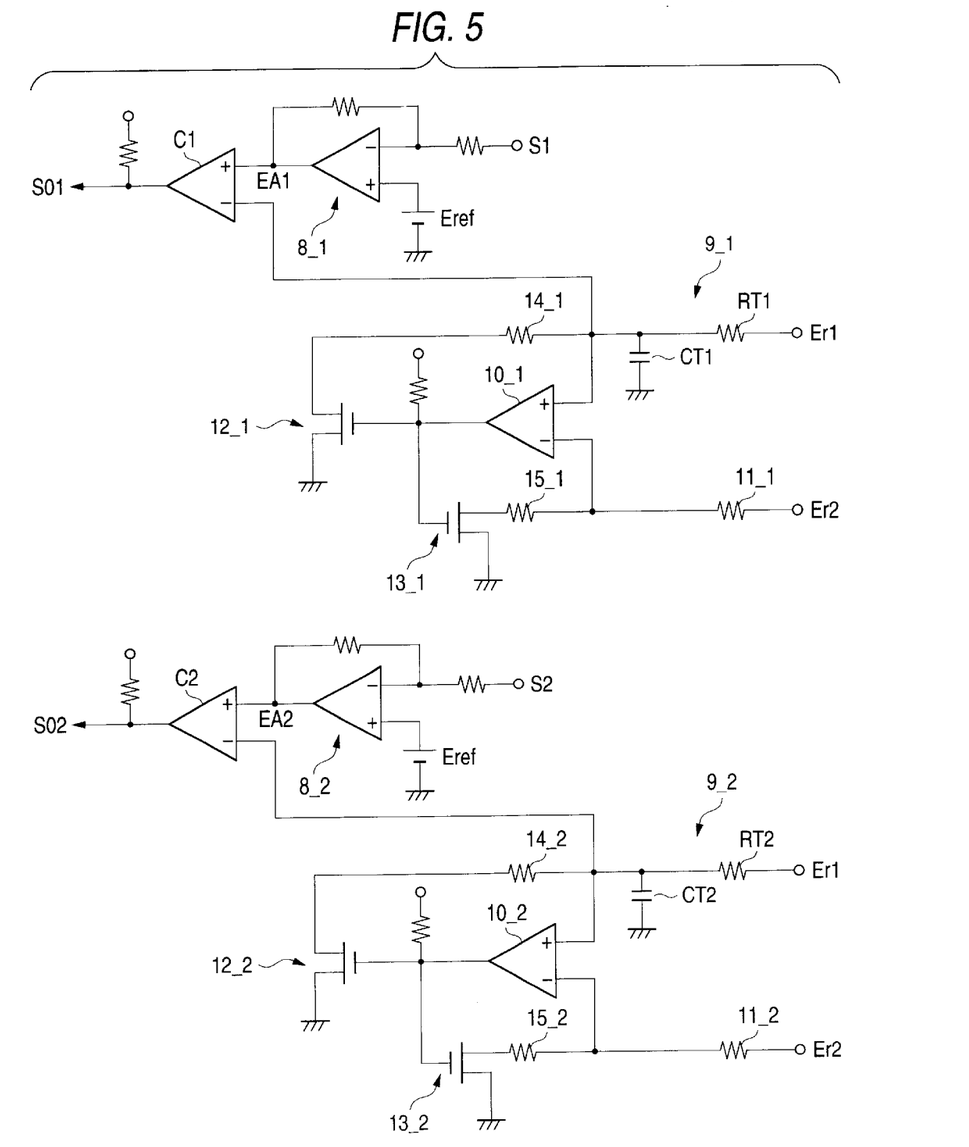
FIG. 5 is a circuit diagram showing a main part about constitution example of a control circuit.

FIG. 5 shows a main part of constitution example at adopting PWM (Pulse Width Modulation) control.

Symbol "S1" shows arithmetic signal based on voltage detecting signal and current detecting signal detected about the discharge lamp 6_1, and is supplied to an error amplifier

8__1 as negative input. Symbol "S2" shows arithmetic signal based on voltage detecting signal and current detecting signal detected about the discharge lamp 6__2, and is supplied to an error amplifier 8__2 as negative input. The voltage detecting signal of the discharge lamp is obtained by dividing output voltage of the DC-DC converting circuit for example, and output current of the DC-DC converting circuit is used for the current detecting signal, or the current detecting signal can be detected by connecting a detecting resistance (shunt resistance) to the discharge lamp. Detail description of the arithmetic signal is omitted because the invention relates to contents of control and any method for generating the arithmetic signal is available as far as the invention. (See Japanese Patent Laid-Open H4-141988, Japanese Patent Laid-Open 2001-6891, and so on.)

To positive terminals of the error amplifiers 8__1 and 8__2, designated reference voltage "Eref" are supplied respectively, and output signal of the error amplifier 8__1 (described "EA1") is supplied to the capacitor C1 of the back stage. Output signal of the error amplifier 8__2 (described "EA2") is supplied to the capacitor C2 of back stage.

Saw tooth wave generating circuits are provided individually for each of comparators C1 and C2. That is, in the saw tooth generating circuits 9__1 and 9__2, these oscillating frequencies are different, saw tooth wave generated by the circuit 9__1 is supplied to negative input terminal of the comparator C1, and saw tooth wave generated by the circuit 9__2 is supplied to negative input terminal of the comparator C2.

Since the circuits 9__1 and 9__2 are the same constitution except difference of time constant by resistor and capacitor, only the circuit 9__1 will be described. (About the circuit 9__2, symbols may be read suitably such as "9__2" for "9__1", "RT2" or A "RT1", "CT2" for "CT1", and "C2" for "C1".)

The resistor RT1 and the capacitor CT1 are connected in series, at one end of the resistor RT1, designated reference voltage (described "Er1"), and the other end of the resistor RT1 is grounded through the capacitor CT1.

A positive input terminal of a comparator 10__1 is connected to the connecting point between the resistor RT1 and the capacitor CT1, and connected to the negative input terminal of the comparator C1. To the negative input of the comparator 10__1, designated reference voltage (described "Er2") is supplied through a resistor 11__1.

Output signal of the comparator 10__1 is sent to two switching elements 12__1 and 13__1. (Analog switches by electric field effect transistors and the like though simplified symbols are shown in the figure.) The switching element 12__1 is connected to positive input terminal of the comparator 10__1 through a small resistor 14__1, and the switching element 13__1 is connected to negative input terminal of the comparator 10__1 through a resistor 15__1.

One switching element of the DC-DC converting circuit is ON/OFF-controlled based on output signal "SO1" of the comparator C1, and the other switching element of the DC-DC converting circuit is ON/OFF-controlled based on output signal "SO2" of the comparator C2 in the example. However, timing of ON/OFF can be shifted (non-synchronizing relation) in each switching element of the DC-DC converting circuit setting so that two switching frequencies are different by changing resistance value of RT2 or each capacitance of capacitors CT1 and CT2 (by making time constant of the circuits 9__1 and 9__2. Although a moment that the ON/OFF timings correspond accidentally is possible to appear, this is temporary so that ripple current "IRP" can be decreased as a whole.

Figure 6:
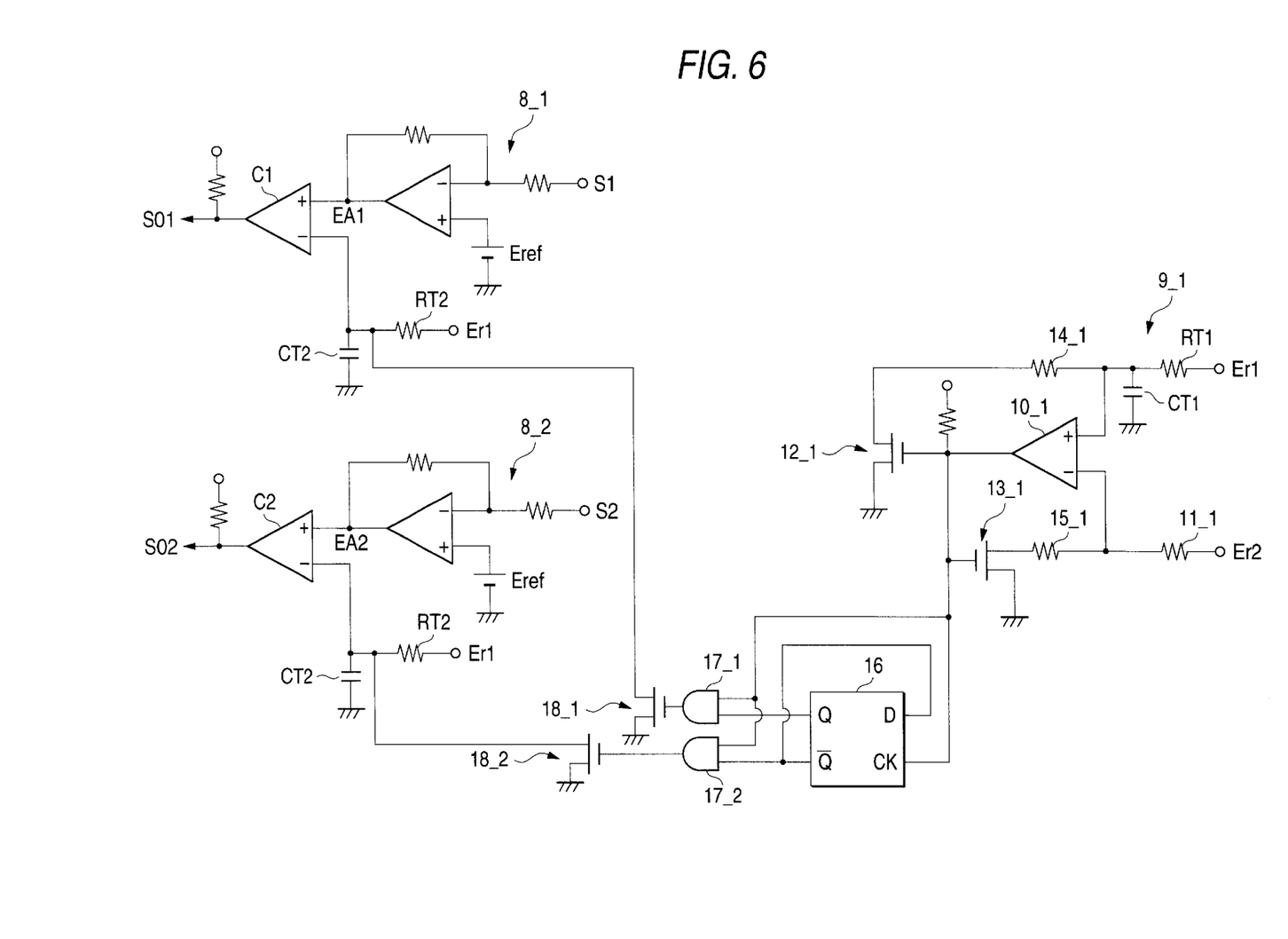
FIG. 6 is a circuit diagram showing a main part about another example of a control circuit.

For making timing of ON/OFF control of each element non-synchronous entirely (that is, moment that ON/OFF timings correspond does not appear perfectly) in the switching elements of the DC-DC converting circuit, a constitution example shown in FIG. 6 is listed for example.

Difference with the constitution example shown in FIG. 5 is as the followings.

Only one saw tooth wave generating circuit 9__1 is provided.

The resistor RT2 and the capacitor CT2 are attached on the comparator C1, reference voltage Er1 is supplied to one end of RT2, and the other end thereof is connected to negative input terminal of the comparator C1 and grounded through the capacitor CT2.

The resistor RT2 and the capacitor CT2 are attached on the comparator C1, reference voltage Er1 is supplied to one end of RT2, and the other end thereof is connected to negative input terminal of the comparator C2 and grounded through the capacitor CT2.

Value of time constant by RT1 and CT1 (See the circuit 9__1) is set to be half of time constant by RT2 and CT2.

In the saw tooth wave generating circuit 9__1, a D flip-flop circuit 16, further two inputs AND (logical product) gates 17__1 and 17__2, and switching elements 18__1 and 18__2 ( analog switch etc.) are provided.

The D flip-flop 16 is provided for switching control to each DC-DC converting circuit, the clock signal input terminal (CK) is connected to the output terminal of the comparator 10__1 of the saw tooth wave generating circuit 9__1, and Q output signal is supplied to one input terminal of the two inputs AND gate 17__1. The Q bar output terminal (shown by adding over line to symbol "Q" in the figure) is connected to D input terminal (constitution of one bit counter), and Q bar output signal is supplied to one input terminal of the two inputs AND gate 17__2.

Both of input terminals of the AND gates 17__1 and 17__2 are connected to the output terminal of the comparator 10__1 of the saw tooth wave generating circuit 9__1, and the switching element 18__1 made ON/OFF receiving output signal of the AND gate 17__1 is connected to negative input terminal of the comparator C1. (That is, when both of output signal of the comparator 10__1 and Q output signal of the D flip-flop 16 are H level, the switching element 18__1 is made ON so that negative input terminal of the comparator C1 is made L level.) The switching element 18__2 made ON/OFF receiving output signal of the AND gate 17__2 is connected to negative input terminal of the comparator C2. (When both of output signal of the comparator 10__1 and Q output signal of the D flip-flop 16 are H level, the switching element 18__2 is made ON so that negative input terminal of the comparator C2 is made L level.)

Figure 7:
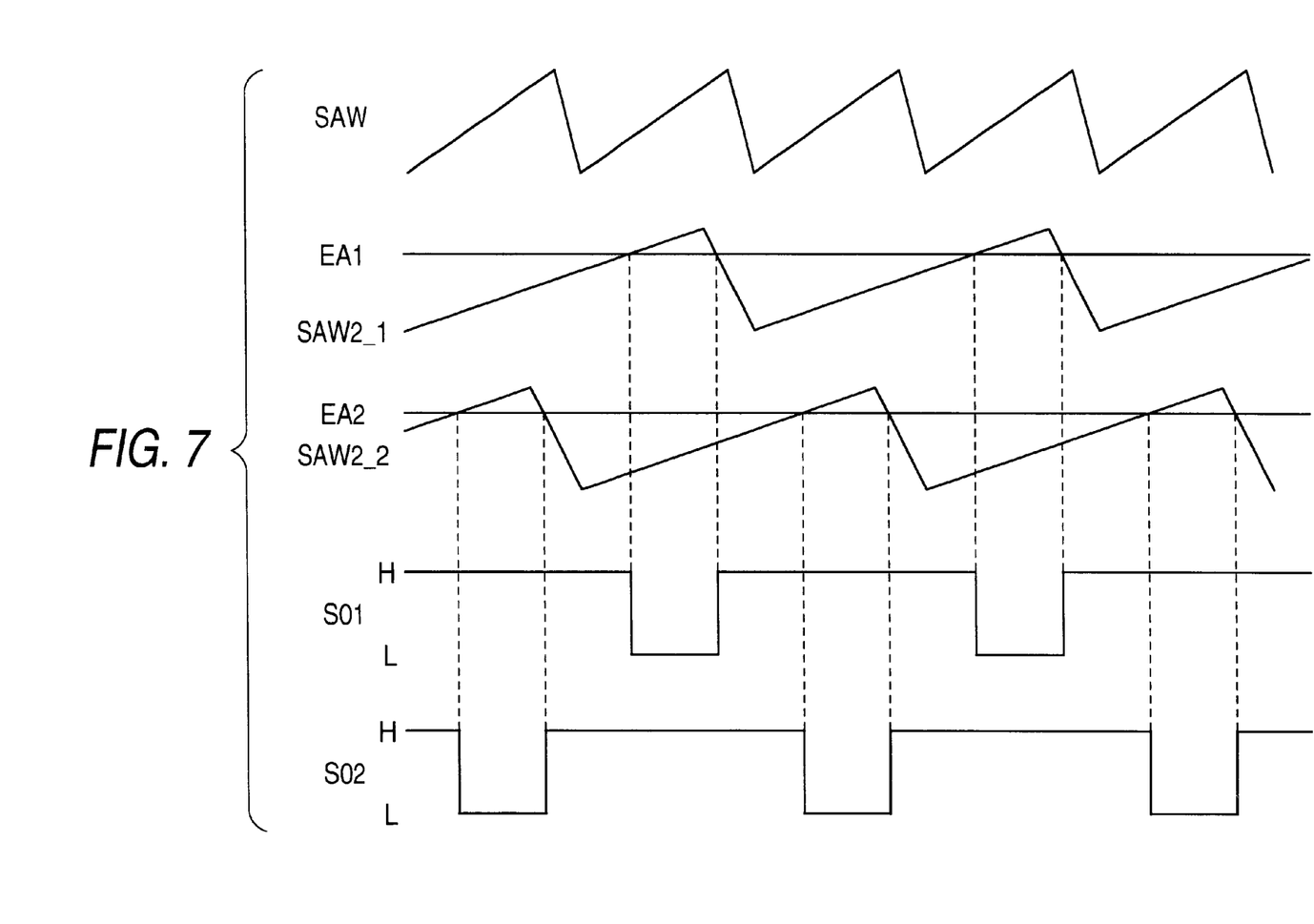
FIG. 7 is a waveform view for describing operation of FIG. 6.

FIG. 7 shows waveform and phase relation of each part for describing operations of the circuit, and meanings of the symbols are as the followings.

"SAW" is saw tooth wave generated by the saw tooth wave generating circuit 9__1. (Oscillating frequency thereof is determined by time constant of RT1 and RT2.)

"SAW2__1" is saw tooth wave supplied to negative input terminal of the comparator C1 by RT1 and RT2.

"SAW2__2" is saw tooth wave supplied to negative input terminal of the comparator C2 by RT1 and RT2.

Signals EA1 and EA2 and SO1 and SO2 are as same as the above-mentioned.

Whenever saw tooth wave SAW by the saw tooth wave generating circuit 9__1 generates two times, saw tooth wave SAW2__1 (or SAW2__2) for comparing with EA1 (or EA2) generates one time so that comparing operation between both is carried out at the comparator C1 (or C2). That is, phase between SAW2_1 and SAW2_2 as shifted half period (because of phase relation of each output signal of the AND gates 17_1 and 17_2), for example, when SAW2_1 exceeds electric potential of EA1, SO1 converts to L level from H level, and after that, SO2 keeps H level while SO1 converts to H level from L level. (Conversely, when SAW2_2 exceeds electric potential of EA2, SO2 converts to L level from H level, and after that, SO1 keeps H level while SO2 converts to H level from L level.)

Thus, since each switching element can be controlled so that timing of ON/OFF does not correspond by supplying control signal based on oscillating signal shifted in phase to each switching element of the DC-DC converting circuit, the above-mentioned ripple current "IRP" can be further improved.

Although an example of two discharge lamps is described in the above description, lighting control of three or more discharge lamps is of course applicable generalizing the content of the invention. The invention is applicable for another control method (PFM: Pulse Frequency Modulation, and the like for example) without limiting to PWM control.

As clear as the above description, according to first aspect of the invention, ripple current and radio noise are depressed by controlling so that signals supplied to each switching element constituting the DC-DC converting circuit do not synchronizes. Therefore, large capacitor in capacitance is not need for the DC-DC converting circuit, and cost for noise measures is little so as to be advantageous on small-sizing and low cost.

According to second aspect of the invention, non-synchronization of control signal can be realized without complex constitution of the circuit by supplying control signals based on different oscillating frequencies to each switching element.

According to third aspect of the invention, non-synchronization of control signal can be surely realized using the same oscillating circuit without changing oscillating frequency by supplying control signals based on oscillating signals shifted in phase to each switching element.

What is claimed is:

1. A discharge lamp lighting circuit for lighting plural discharge lamps, comprising;
    a plurality of DC-DC converting circuits for converting direct current input voltage to designated direct current voltage, each DC-DC converting circuit having a switching element;
    a control circuit for carrying out ON/OFF control at each of said switching elements, wherein state of conductivity or non-conductivity of each switching element is controlled as non-synchronization; and
    a plurality of DC-AC converting circuits for respectively supplying a power to said discharge lamps, wherein each discharge lamp is lightened by each set of the DC-DC converting circuit and the DC-AC converting circuit.

2. A The discharge lamp lighting circuit according to claim 1, wherein a first circuit for first discharge lamp includes a first DC-DC converting circuit, a first DC-AC converting circuit, and a first starting circuit, and for a second circuit for second discharge lamp includes a second DC-DC converting circuit, a second DC-AC converting circuit, and a second starting circuit, and a control circuit is commonly provided.

3. A discharge lamp lighting circuit for lighting plural discharge lamps, comprising;
    a plurality of DC-DC converting circuits for converting direct current input voltage to designated direct current voltage, each DC-DC converting circuit having a switching element;
    a control circuit for carrying out ON/OFF control at each of said switching elements, wherein state of conductivity or non-conductivity of each switching element is controlled as non-synchronization; and
    a DC-AC converting circuit for supplying a power to said discharge lamps, wherein two discharge lamps are lighted using a DC-DC converting circuit obtaining positive pole output, a DC-DC converting circuit obtaining negative pole output, and one DC-AC converting circuit.

4. A The discharge lamp lighting circuit according to claim 3, wherein said DC-DC converting circuits are arranged in parallel each other, and
    said control circuit sends control signals to the DC-DC converting circuits, respectively, to control ON/OFF of the switching elements in the circuits, and further sends control signal to the DC-AC converting circuit so as to control alternative operation.

* * * * *